(12) United States Patent
Geng et al.

(10) Patent No.: US 8,897,991 B2
(45) Date of Patent: Nov. 25, 2014

(54) FUEL QUALITY MONITORING SYSTEM

(75) Inventors: Yunpeng Geng, Northville, MI (US); Qigui Wang, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 302 days.

(21) Appl. No.: 13/567,145

(22) Filed: Aug. 6, 2012

(65) Prior Publication Data

US 2014/0039777 A1 Feb. 6, 2014

(51) Int. Cl.
*F02D 28/00* (2006.01)

(52) U.S. Cl.
USPC .......................................... 701/102; 123/1 A

(58) Field of Classification Search
USPC ................... 701/102–105; 123/1 A, 3, 299
See application file for complete search history.

(56) References Cited

U.S. PATENT DOCUMENTS

| | | | |
|---|---|---|---|
| 5,941,217 A * | 8/1999 | Cheng et al. ................... | 123/1 A |
| 6,584,834 B1 * | 7/2003 | Lehner et al. .............. | 73/114.08 |
| 8,662,024 B2 * | 3/2014 | Leone ................................ | 123/3 |
| 2012/0330532 A1 * | 12/2012 | Matsuura et al. ............. | 701/103 |

* cited by examiner

*Primary Examiner* — Hieu T Vo
(74) *Attorney, Agent, or Firm* — Quinn Law Group, PLLC

(57) ABSTRACT

A fuel quality monitoring system includes a fuel composition sensor configured to provide an indication of a composition of a liquid fuel within a fuel tank, and a controller. The controller is configured to receive the indication of the monitored fuel composition from the fuel composition sensor; detect an amount of an impurity from the received indication; and compare the amount of the impurity to a threshold. If the amount of the impurity exceeds the threshold, the controller is configured to adjust an operating parameter of an engine to account for the detected impurity. When the amount of the impurity exceeds a threshold which makes engine combustion unmanageable, the fuel is restricted from entering the engine or fuel tank.

19 Claims, 2 Drawing Sheets

FUEL QUALITY MONITORING SYSTEM

TECHNICAL FIELD

The present invention relates generally to an in-situ fuel quality monitoring system for an internal combustion engine.

BACKGROUND

A typical automotive vehicle includes an internal combustion engine that ignites a volatile fuel to provide a motive force. Many fuels are available that each may have a different composition. For example, engine fuels may include varying proportions of gasoline, diesel, ethanol, methanol, or alcohol. Additionally, these fuels may have varying proportions of certain fuel additives, such as octanes, oxygenates, antioxidants, and stabilizers. Often the engine is tuned to a specific composition of fuel in an effort to maximize performance, output power, and/or fuel efficiency.

It is common practice for a vehicle to include an onboard fuel tank to store the fuel for future use by the engine. The onboard fuel tank is refillable by offboard fuel pumps, such as the ones found at commercial gas stations.

SUMMARY

A fuel quality monitoring system includes a fuel composition sensor configured to provide an indication of a composition of a liquid fuel within a fuel tank, and a controller. The controller may be configured to receive the indication of the monitored fuel composition from the fuel composition sensor; detect an amount of an impurity from the received indication; and compare the amount of the impurity to a threshold.

If the detected amount of impurity exceeds the threshold, the controller may be configured to adjust an operating parameter of an engine to account for the impurity. For example, the controller may adjust a spark timing, a cam phaser, and/or an air/fuel ratio to maximize the power, performance, and/or longevity of the engine.

Additionally, the controller may provide an alert if the amount of the impurity exceeds the threshold. In this manner, the operator of the vehicle may take corrective action, or be otherwise notified of the impure fuel.

In one configuration, the controller may further compare the amount of the impurity to a second threshold that is further from ideal than the first threshold. If the levels of impurities exceed the second threshold, the controller may restrict fuel from entering the engine to prevent damage.

A second fuel composition sensor may be disposed within a filler tube in communication with the fuel tank to monitor liquid fuel entering the fuel tank. The second fuel composition sensor may provide an indication of a composition of the liquid fuel, as it flows through the filler tube. In turn, the controller may receive this indication of the monitored fuel composition from the second fuel composition sensor, detect an amount of an impurity from the indication, and compare the amount of the impurity to the second threshold. If the levels of impurities in the flowing/incoming fuel exceed the second threshold, the controller may restrict fuel from entering the fuel tank, such as by closing a shut-off valve disposed along a vent tube.

Likewise, a corresponding method may include: monitoring a composition of a liquid fuel disposed within a fuel tank; detecting an amount of an impurity from the monitored composition; comparing the amount of the impurity to a first threshold; and adjusting an operating parameter of an engine if the amount of the impurity exceeds the first threshold.

The above features and advantages and other features and advantages of the present invention are readily apparent from the following detailed description of the best modes for carrying out the invention when taken in connection with the accompanying drawings.

DETAILED DESCRIPTION

Figure 1:
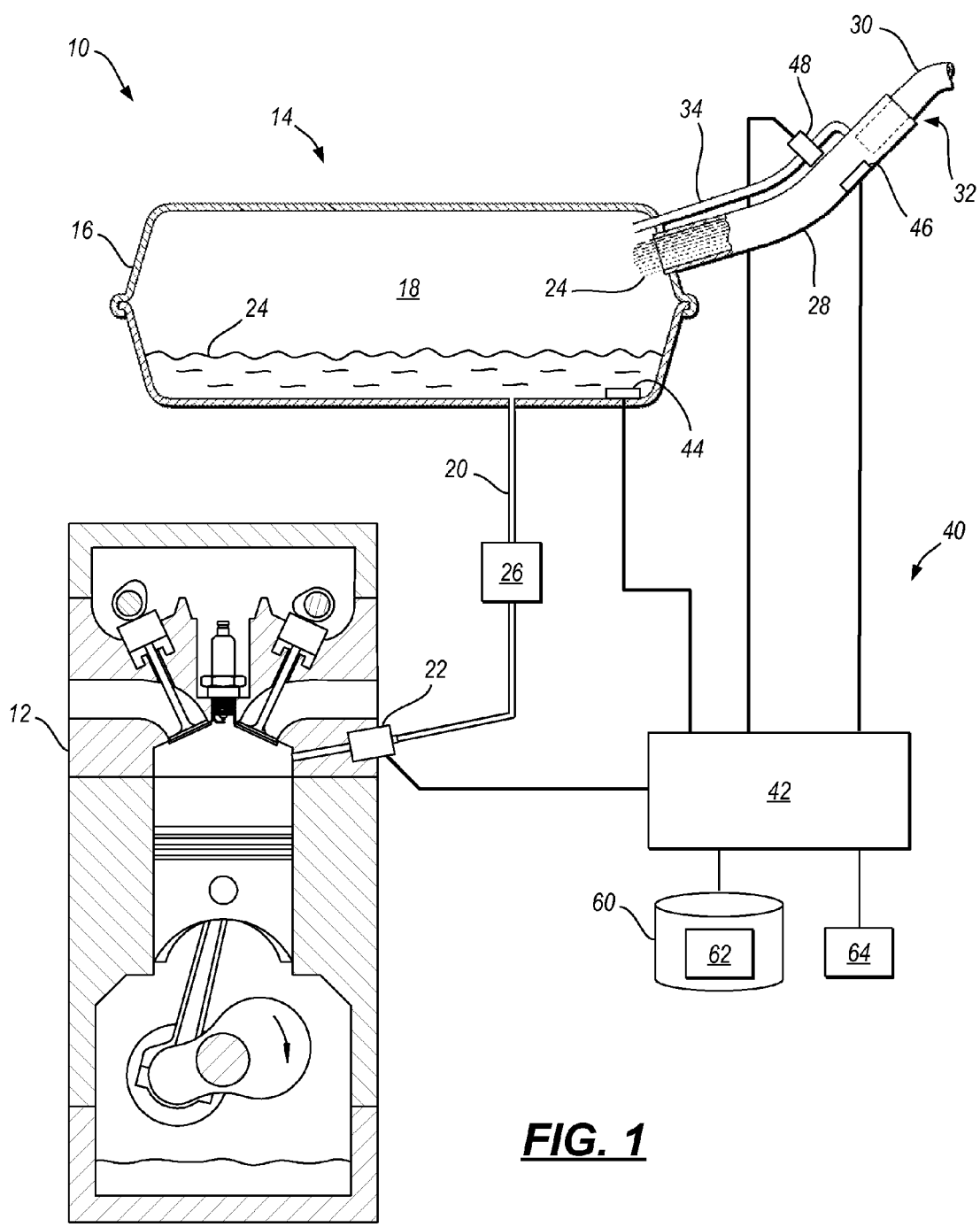
FIG. 1 is a schematic diagram of a fuel monitoring system in communication with a fuel tank.

Referring to the drawings, wherein like reference numerals are used to identify like or identical components in the various views, FIG. 1 schematically illustrates a vehicle 10, such as an automobile, including an engine 12 and a fuel tank assembly 14. The engine 12 may be any form of spark-ignited or compression-ignited engine, and may operate on any suitable fuel, such as, without limitation, gasoline, diesel, ethanol blends, and/or ethanol.

The fuel tank assembly 14 includes a fuel tank 16 that may, in turn, define a chamber 18. The chamber 18 may be in fluid communication with the engine 12 through one or more fuel lines 20 and/or electronic fuel injectors 22. The fuel tank 16 may be rigidly mounted to a frame/chassis component of the vehicle 10 (not shown), and may be adapted to store liquid fuel 24 for use (combustion) by the engine 12. During operation, an onboard fuel pump 26 may draw the fuel 24 from the chamber 18, pressurize it, and provide it to the engine 12 where it may be selectively injected into a combustion chamber via the one or more electronic fuel injectors 22.

The fuel tank assembly 14 may include a filler tube 28 coupled with the fuel tank 16 to provide a fuel inlet into the chamber 18. A nozzle 30 of an offboad pump assembly may be freely insertable into the filler tube 28 at an inlet portion 32 to provide liquid fuel 24 into the chamber 18 during a re-fueling operation, such as shown in FIG. 1.

In one configuration, the fuel tank assembly 14 may include a vent tube 34 configured to fluidly couple the chamber 18 with the inlet portion 32 of the filler tube 28. In one configuration, during a re-fueling operation, air may pass from within the chamber 18 out through the vent tube 34 until a predetermined volume of fuel 24 is received within the chamber 18. Once air flow through the vent tube 34 is blocked, such as by the level of the liquid fuel 24, the offboard pump may be automatically stopped to prevent overfilling. As may be appreciated, other vent tube configurations may be employed for the same purpose, or the vent tube 34 may be omitted entirely.

A fuel quality monitoring system 40 may be employed to continuously monitor the composition of the fuel 24 being provided to the engine 12. As will be discussed below, if slight amounts/levels of impurities are detected, the fuel quality monitoring system 40 may dynamically adjust the behavior of the engine to compensate for the change in fuel response/available power. If the composition of the fuel 24, however, is so far outside of the engine's tolerances that the engine is unable to compensate (e.g., diesel fuel is provided into a gasoline engine, or water is provided into a diesel engine), then the fuel quality monitoring system 40 may take action to prevent the ingress of the fuel into the tank 16.

The fuel quality monitoring system 40 may include one or more fuel composition sensors and a controller 42. For example, in one configuration, a first fuel composition sensor 44 may be disposed within the cavity 18 defined by the fuel tank 16 (i.e., the fuel tank sensor 44), and may be configured to monitor the composition of the liquid fuel 24 disposed within the tank 16. In other configurations, the fuel quality monitoring system 40 may include a second fuel composition sensor 46 configured to monitor the composition of the liquid fuel 24 flowing through the filler tube 28 and into the tank 16 (i.e., the fuel ingress sensor 46).

Each of the fuel tank sensor 44 and fuel ingress sensor 46 may be respectively configured to detect the composition and/or properties of the fuel 24 that it contacts, and may provide an indication of the detected composition to the controller 42. Each sensor 44, 46 may employ various composition sensing techniques, such as, for example, spectroscopy. As such, each sensor 44, 46 may include suitable circuitry to monitor the light dispersion and light absorption properties of the fuel across a plurality of wavelengths. In one configuration, each sensor 44, 46 may analyze the fuel 24 for general composition (e.g., gasoline, diesel, etc) and/or the presence of sulfur, aromatics, olefins, ethanol, methanol, inorganic ions, and/or metallic additives, and make predictions for gasoline volatilities and drivability index.

The controller 42 may be embodied as one or multiple digital computers or data processing devices, having one or more microcontrollers or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, input/output (I/O) circuitry, and/or signal conditioning and buffering electronics. The controller 42 may be configured to automatically perform one or more control/processing routines to detect the quality and/or composition of the fuel 24. Each control/processing routine may be embodied as software or firmware, and may either be stored locally on the controller 42, or may be readily assessable by the controller 42.

In addition to the one or more fuel composition sensors (e.g., sensors 44, 46), and the controller 42, the fuel quality monitoring system 40 may include a shut-off valve 48 disposed along the vent tube 34. The shut-off valve 48 may operate at the direction of the controller 42, and may be configured to selectively restrict air flow through the tube 34. By restricting air flow from the chamber 18 through the vent tube 34, the controller 42 and shut-off valve 48 may be capable of stopping any offboard pump from filling the fuel tank 16. In another embodiment (not shown), the shut-off valve 48 may be disposed along the filler tube 28, such that it may be configured to directly block fluid flow through the tube 28 at the direction of the controller 42.

Figures 2, 3:
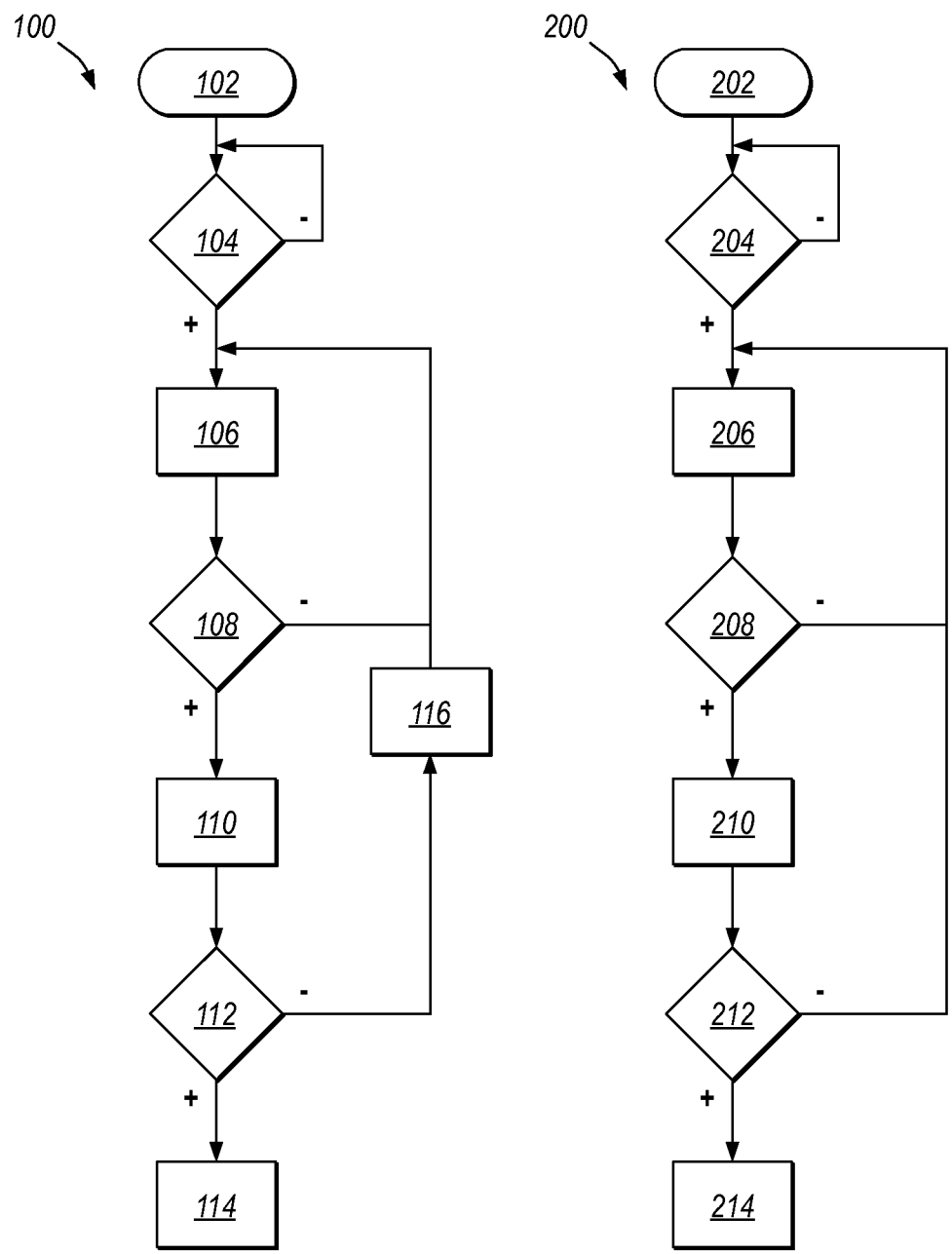
FIG. 2 is a schematic flow diagram of a method of monitoring the fuel quality of a latent fuel in a fuel tank.
FIG. 3 is a schematic flow diagram of a method of monitoring the fuel quality of a fuel being provided into a fuel tank.

FIGS. 2 and 3 illustrate two separate methods 100, 200 (respectively) of monitoring fuel quality. These methods 100, 200 may be performed individually, sequentially, or simultaneously with each other to respond to unexpected fuel 24. As shown, FIG. 2 illustrates a method 100 of monitoring the latent fuel in a fuel tank 16, while FIG. 3 illustrates a method 200 of monitoring the fuel quality of fuel 24 being provided into the fuel tank 16. Each method 100, 200, may be performed by the controller 42 and may be embodied as software or firmware in memory 60 associated with the controller 42.

The method 100 of monitoring the quality of a latent fuel in a fuel tank 16 may begin at step 102 when the routine is initialized (e.g., when a key is turned to an accessory position, prior to ignition of the engine 12). Immediately following the initialization at step 102, the controller 42 may check whether fuel 24 is present in the tank 16 (step 104). This may be performed, for example, by monitoring a fuel gauge, as is common in the art.

If fuel 24 is present, the controller 42 may determine the composition of the fuel, such as by polling the fuel tank sensor 44 (step 106). In one configuration, the sensor 44 may return a fuel composition "fingerprint," such as may be obtained via spectroscopy or other composition detection means. Referring again to FIG. 1, upon receipt of the fuel composition "fingerprint" from the sensor 44, the controller 42 may either analytically determine the fuel composition, or may consult a lookup table 62 stored in memory 60 associated with the controller 42 to determine the fuel composition. In this step, the controller 42 may quantify one or more present fuel impurities from the determined fuel composition. As used herein, an "impurity" is any deviation from an "ideal" fuel composition/property that would result in the most optimal engine performance. Examples of "impurities" may involve differences in amounts of present octanes, additives, sulfur levels, aromatics, olefins, ethanols, methanols, gross fuel composition (e.g., gasoline, diesel, biodiesel), oxygenates, metallic additives, and/or moisture content. Such impurities and/or compositional changes may alter or shift gasoline volitilities and/or drivability indices from their ideal ranges.

Referring again to FIG. 2, once the controller 42 has determined the fuel composition and/or amounts of present impurities using the fuel tank sensor 44 in step 106, it may compare the composition to a first composition threshold in step 108. If the determined amount of impurities is below the first composition threshold, the fuel is deemed to be within acceptable tolerances, and the controller 42 may re-poll the sensor after a predetermined period of time.

If the composition and/or levels of impurities in the fuel exceed the first composition threshold, the controller 42 may provide an alert or warning to an operator of the vehicle 10 (step 110), such as through an alert device 64, as shown in FIG. 1. The alert device 64 may include a liquid crystal display that may display the name of the impurity that was out of tolerance. In another configuration, the alert device 64 may be a warning light or audible alarm that illuminates/sounds when the composition exceeds the threshold. Alternatively, or in addition to the operator warning, the controller 42 may be configured to log the nature of the out-of-tolerance fuel impurity in step 110, which may be beneficial when diagnosing warranty conditions at a later point in time.

Following the operator alert and/or impurity logging in step 110, the controller may compare the amount of detected impurities to a second composition threshold in step 112. The second composition threshold may be further away from "ideal" than the first composition threshold, and may indicate fuel types/compositions that the engine may be unable to properly combust. If the determined composition and/or levels of impurities exceed the second composition threshold, the controller 42 may stop the flow of fuel to the engine 12 (step 114), such as by overriding the actuation signal to the fuel injectors 22, or by turning off the fuel pump 26. In this manner, severely out-of-tolerance fuel may be withheld from the engine 12, where it may have ultimately resulted in damage.

If the determined composition and/or levels of impurities is between the first and second fuel composition thresholds, the controller 42 may alter the behavior of the engine 12 (i.e., adjust one or more operating parameters of the engine) to account for the slightly less-than-ideal fuel (step 116). For example, in step 116, the controller 42 may vary the spark timing (i.e., in a gasoline engine), vary the cam phasers, and/or dynamically adjust the air/fuel ratio to maximize the power, performance, and longevity of the engine given the less-than-ideal fuel. Such modifications may be made either directly by the controller 42 (in the event the fuel quality monitoring system 40 is integrated into the engine control unit (ECU), or, alternatively may be conveyed to the engine control unit by the controller 42.

The method 200 of monitoring the fuel quality of fuel 24 being provided into the fuel tank 16 may begin at step 202 when the routine is initialized (e.g., when a fuel door to the vehicle is opened, or when a fuel cap to the filler tube 28 is removed). Following the initialization of the routine at step 202, the controller 42 may check whether fuel 24 is being provided through the filler tube 28 (step 204). This determination may be performed, for example, using a flow gauge, or by monitoring a fuel ingress sensor 46 for the presence of a liquid.

If a flowing liquid is detected at step 204, the controller 42 may determine the composition of the fuel, such as by polling the fuel ingress sensor 46 (step 206). Similar to the fuel tank sensor 44, the fuel ingress sensor 46 may return a fuel composition "fingerprint," which may be obtained via spectroscopy or other composition detection means. Referring again to FIG. 1, upon receipt of the fuel composition "fingerprint" from the sensor 46, the controller 42 may either analytically determine the composition of the provided fuel 24, or may consult the lookup table 62 stored in memory 60 to determine the fuel composition. In this step, the controller 42 may quantify one or more present fuel impurities from the determined fuel composition.

Referring again to FIG. 2, once the controller 42 has determined the fuel composition and/or amount of impurities present in the incoming fuel from the fuel ingress sensor 46 in step 206, it may compare the composition/amount of impurities to the first composition threshold in step 208. If the amount of impurity is below the first composition threshold, the fuel is deemed to be within acceptable tolerances, and the controller 42 may re-poll the sensor after a predetermined period of time.

If the composition and/or levels of impurities in the incoming fuel exceed the first composition threshold, the controller 42 may provide a warning to an operator of the vehicle 10 (step 210), such as through an alert device 64, as shown in FIG. 1. In one configuration, the alert device 64 may be disposed immediately proximate the inlet portion 32 of the filler tube 28 to immediately provide the alert.

Following the operator alert in step 210, the controller may compare the amount of impurity to the second composition threshold in step 212. As described above, the second composition threshold may be further away from "ideal" than the first composition threshold, and may indicate fuel types/compositions that the engine may be unable to properly combust. If the determined composition and/or levels of impurities in the incoming fuel exceed the second composition threshold, the controller 42 may stop the flow of fuel through the filler tube 28 (step 214), such as by closing a shut-off valve 48 disposed along the vent tube 34 and/or by closing a shut-off valve disposed along the filler tube (not shown). In this manner, severely out-of-tolerance fuel may be withheld from the fuel tank 16, where it may have ultimately resulted in damage to the engine 12.

In one configuration, any of the following levels may result in reduced performance of the engine 12 (i.e., the first composition threshold): sulfur levels in excess of 500 ppm (parts per million); aromatic hydrocarbons in excess of 50% by volume; olefin compounds in excess of 10% by volume; ethanol in excess of 1% by volume; methanol in excess of 1% by volume; inorganic ions in excess of 1.0 ppm; higher in distillation profile between T70 to T90, abnormal fuel volatilities in vapor pressures, low in T50 and a high drivability index, and the presence of metallic additives. Should the fuel composition/properties be within acceptable ranges, the readings from the sensors may be used to fine tune vehicle performance as may be needed for vehicle driveability.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A fuel quality monitoring system comprising:
   a fuel composition sensor configured to provide an indication of a composition of a liquid fuel within a fuel tank;
   a controller configured to:
      receive the indication of the monitored fuel composition from the fuel composition sensor;
      detect an amount of an impurity from the received indication;
      compare the amount of the impurity to a first threshold; and
      adjust an operating parameter of an engine if the amount of the impurity exceeds the first threshold.

2. The fuel quality monitoring system of claim 1, wherein the operating parameter of the engine is at least one of a spark timing, a cam phaser, and an air/fuel ratio.

3. The fuel quality monitoring system of claim 1, wherein the controller is further configured to provide an alert if the amount of the impurity exceeds the first threshold.

4. The fuel quality monitoring system of claim 1, wherein the controller is further configured to:
   compare the amount of the impurity to a second threshold, the second threshold being further from ideal than the first threshold; and
   restrict fuel from entering the engine if the amount of the impurity exceeds the second threshold.

5. The fuel quality monitoring system of claim 1, wherein the fuel tank defines a cavity configured to hold the liquid fuel, and wherein the fuel composition sensor is disposed within the cavity.

6. The fuel quality monitoring system of claim 1, further comprising a second fuel composition sensor disposed within a filler tube in communication with the fuel tank, the second fuel composition sensor configured to provide an indication of a composition of a liquid fuel flowing through the filler tube; and
   wherein the controller is further configured to:
      receive the indication of the monitored fuel composition from the second fuel composition sensor;
      detect an amount of an impurity from the indication received from the second fuel composition sensor;
      compare the amount of the impurity to a second threshold, the second threshold being further from ideal than the first threshold; and
      restrict fuel from entering the fuel tank if the amount of the impurity exceeds the second threshold.

7. The fuel quality monitoring system of claim 6, further comprising:
   a vent tube disposed between the fuel tank and the filler tube;

a shut-off valve configured to selectively restrict air flow through the vent tube; and wherein the controller is configured to restrict fuel from entering the fuel tank by commanding the shut-off valve to restrict air flow through the vent tube.

8. A fuel quality monitoring system comprising:
a fuel composition sensor configured to provide an indication of a composition of a liquid fuel flowing through a filler tube in communication with a fuel tank;
a controller configured to:
receive the indication of the monitored fuel composition from the fuel composition sensor;
detect an amount of an impurity from the received indication;
compare the amount of the impurity to a first threshold; and
restrict fuel from entering the fuel tank if the amount of the impurity exceeds the first threshold.

9. The fuel quality monitoring system of claim 8, further comprising a second fuel composition sensor configured to provide an indication of a composition of a liquid fuel within the fuel tank; and
wherein the controller is further configured to:
receive the indication of the monitored fuel composition from the second fuel composition sensor;
detect an amount of an impurity from the indication received from the second fuel composition sensor;
compare the amount of the impurity to a second threshold, the first threshold being further from ideal than the second threshold; and
adjust an operating parameter of an engine if the amount of the impurity exceeds the second threshold.

10. The fuel quality monitoring system of claim 9, wherein the operating parameter of the engine is at least one of a spark timing, a cam phaser, and an air/fuel ratio.

11. The fuel quality monitoring system of claim 9, wherein the controller is further configured to provide an alert if the amount of the impurity from either the first fuel composition sensor or the second fuel composition sensor exceeds the second threshold.

12. The fuel quality monitoring system of claim 9, wherein the controller is further configured to:
restrict fuel from entering the engine if the amount of the impurity detected from the second fuel composition sensor exceeds the first threshold.

13. The fuel quality monitoring system of claim 9, wherein the fuel tank defines a cavity configured to hold the liquid fuel, and wherein the second fuel composition sensor is disposed within the cavity.

14. The fuel quality monitoring system of claim 8, further comprising:
a vent tube disposed between the fuel tank and the filler tube;
a shut-off valve configured to selectively restrict air flow through the vent tube; and
wherein the controller is configured to restrict fuel from entering the fuel tank by commanding the shut-off valve to restrict air flow through the vent tube.

15. A method comprising:
monitoring a composition of a liquid fuel disposed within a fuel tank;
detecting an amount of an impurity from the monitored composition;
comparing the amount of the impurity to a first threshold; and
adjusting an operating parameter of an engine if the amount of the impurity exceeds the first threshold.

16. The method of claim 15, wherein adjusting an operating parameter of the engine includes at least one of:
adjusting a spark timing of the engine;
adjusting a cam phaser of the engine; and
adjusting an air/fuel ratio of the engine.

17. The method of claim 15, further comprising:
comparing the amount of the impurity to a second threshold; and
restricting fuel from entering the engine if the amount of the impurity exceeds the second threshold.

18. The method of claim 15, further comprising:
monitoring a composition of a liquid fuel flowing into the fuel tank;
detecting an amount of an impurity from the monitored composition of the liquid fuel flowing into the fuel tank;
comparing the amount of the impurity from the flowing fuel to a second threshold; and
restricting the flowing fuel from entering the fuel tank if the amount of the impurity exceeds the second threshold.

19. The method of claim 15, further comprising recording the amount of the impurity for subsequent analysis.

* * * * *